United States Patent
Kumar et al.

(10) Patent No.: US 12,493,075 B1
(45) Date of Patent: Dec. 9, 2025

(54) TEST PATTERN RESET CONTROL CIRCUIT

(71) Applicant: STMicroelectronics International N.V., Geneva (CH)

(72) Inventors: Harish Kumar, Noida (IN); Nitin Kumar, Greater Noida (IN)

(73) Assignee: STMicroelectronics International N.V., Geneva (CH)

( * ) Notice: Subject to any disclaimer, the term of this patent is extended or adjusted under 35 U.S.C. 154(b) by 0 days.

(21) Appl. No.: 18/735,599

(22) Filed: Jun. 6, 2024

(51) Int. Cl.
   *G01R 31/3185* (2006.01)

(52) U.S. Cl.
   CPC ........... *G01R 31/318544* (2013.01); *G01R 31/318555* (2013.01); *G01R 31/318558* (2013.01); *G01R 31/318563* (2013.01); *G01R 31/318586* (2013.01)

(58) Field of Classification Search
   CPC .... G01R 31/318544; G01R 31/318555; G01R 31/318558; G01R 31/318563; G01R 31/318586
   USPC .......................................... 714/726, 727, 729
   See application file for complete search history.

(56) References Cited

U.S. PATENT DOCUMENTS

| | | | | |
|---|---|---|---|---|
| 6,546,514 B1 * | 4/2003 | Hayem | .......... | G01R 31/318342 714/741 |
| 8,775,882 B2 * | 7/2014 | Dimri | ............ | G01R 31/318541 714/726 |
| 2004/0111658 A1 * | 6/2004 | Natsume | ........ | G01R 31/318583 714/752 |
| 2004/0172605 A1 * | 9/2004 | Kuge | ...................... | G06F 30/39 716/114 |
| 2010/0107023 A1 | 4/2010 | Guettaf et al. | | |
| 2012/0146697 A1 | 6/2012 | Leach et al. | | |
| 2012/0166900 A1 * | 6/2012 | Dimri | ............ | G01R 31/318541 714/E11.155 |
| 2014/0201584 A1 | 7/2014 | Tekumalla et al. | | |
| 2015/0276866 A1 * | 10/2015 | Jindal | ............ | G01R 31/318583 714/727 |
| 2015/0276874 A1 | 10/2015 | Morton | | |
| 2016/0131705 A1 | 5/2016 | Kulkarni et al. | | |
| 2018/0011141 A1 * | 1/2018 | Srinivasan | ....... | G01R 31/31855 |
| 2021/0089110 A1 * | 3/2021 | Katayama | ............. | G06F 1/3275 |
| 2024/0319270 A1 * | 9/2024 | Makkar | ............ | G01R 31/31701 |

* cited by examiner

*Primary Examiner* — John J Tabone, Jr.
(74) *Attorney, Agent, or Firm* — Slater Matsil, LLP

(57) ABSTRACT

A scan reset control circuit includes a single scan reset input configured to receive a reset signal, a plurality of scan reset outputs configured to be coupled to a plurality of circuit blocks in a one-to-one ratio, a plurality of writable non-scan test data registers including register outputs configured to assert or deassert the reset signal, and a plurality of reset enable circuits coupled to the plurality of scan reset outputs in a one-to-one ratio. Each of the scan reset outputs is configured to simultaneously reset a set of scan flip-flops of the corresponding circuit block. Each of the plurality of reset enable circuits includes an input coupled to the single scan reset input, a selector input coupled to the register outputs, and an output coupled to the corresponding scan reset output.

20 Claims, 8 Drawing Sheets

TEST PATTERN RESET CONTROL CIRCUIT

TECHNICAL FIELD

The present invention relates generally to testing of integrated circuits, and, in particular embodiments, to circuits and structures for covering faults on the reset network of an integrated circuit, and methods of operation thereof.

BACKGROUND

As electronic devices become more and more complicated, hardware validation during manufacturing becomes increasingly important. Design for test (DFT) techniques are typically used to incorporate testability features into hardware design to improve testing capabilities. For example, a test controller, test registers, logic, and other components may be included in circuit design so that the circuit can be effectively tested. DFT is commonly used in conjunction with automatic test pattern generation (ATPG) to test for defective digital circuits in an automated fashion.

A test controller may be used to provide an interface between a general purpose computing device and a device under test (DUT) control. Test controllers may be external or integrated into the DUT. Industry standards such as the joint test action group (JTAG) standardize on-chip instrumentation for testing by specifying a serial communication interface that affords access to test registers.

SUMMARY

In accordance with an embodiment of the invention, a scan reset control circuit includes a single scan reset input configured to receive a reset signal, a plurality of scan reset outputs configured to be coupled to a plurality of circuit blocks in a one-to-one ratio, a plurality of writable non-scan test data registers including register outputs configured to assert or deassert the reset signal, and a plurality of reset enable circuits coupled to the plurality of scan reset outputs in a one-to-one ratio. Each of the scan reset outputs is configured to simultaneously reset a set of scan flip-flops of the corresponding circuit block. Each of the plurality of reset enable circuits includes an input coupled to the single scan reset input, a selector input coupled to the register outputs, and an output coupled to the corresponding scan reset output.

In accordance with another embodiment of the invention, an integrated circuit includes scan reset pad configured to receive a reset signal external to the integrated circuit, a plurality of circuit blocks including a set of scan flip-flops configured to be simultaneously reset by the reset signal, a plurality of writable non-scan test data registers including register outputs configured to assert or de-assert the reset signal, and a plurality of reset enable circuits coupled to the plurality of circuit blocks in a one-to-one ratio. Each of the plurality of reset enable circuits includes an input coupled to the scan reset pad, a selector input coupled to the register outputs, and an output coupled to the corresponding circuit block.

In accordance with still another embodiment of the invention, a method of testing an integrated circuit that includes a plurality of circuit blocks includes shifting a first test pattern into a plurality of sets of scan flip-flops of the integrated circuit, storing a first reset pattern in a plurality of writable non-scan test data registers of the integrated circuit, and asserting a scan reset signal at a scan reset pad of the integrated circuit to test for reset faults, deasserting the scan reset signal to a first subset of circuit blocks of the plurality of circuit blocks and asserting the scan reset signal to the remaining circuit blocks not in the first subset at outputs of the writable non-scan test data registers using the first reset pattern, launching the first test pattern while the scan reset signal is deasserted to the first subset of circuit blocks and asserted to the remaining circuit blocks not in the first subset, and capturing results of the first test pattern. Each set of scan flip-flops is included within a corresponding circuit block of the plurality of circuit blocks in a one-to-one ratio.

BRIEF DESCRIPTION OF THE DRAWINGS

For a more complete understanding of the present invention, and the advantages thereof, reference is now made to the following descriptions taken in conjunction with the accompanying drawings, in which.

Figure 1:
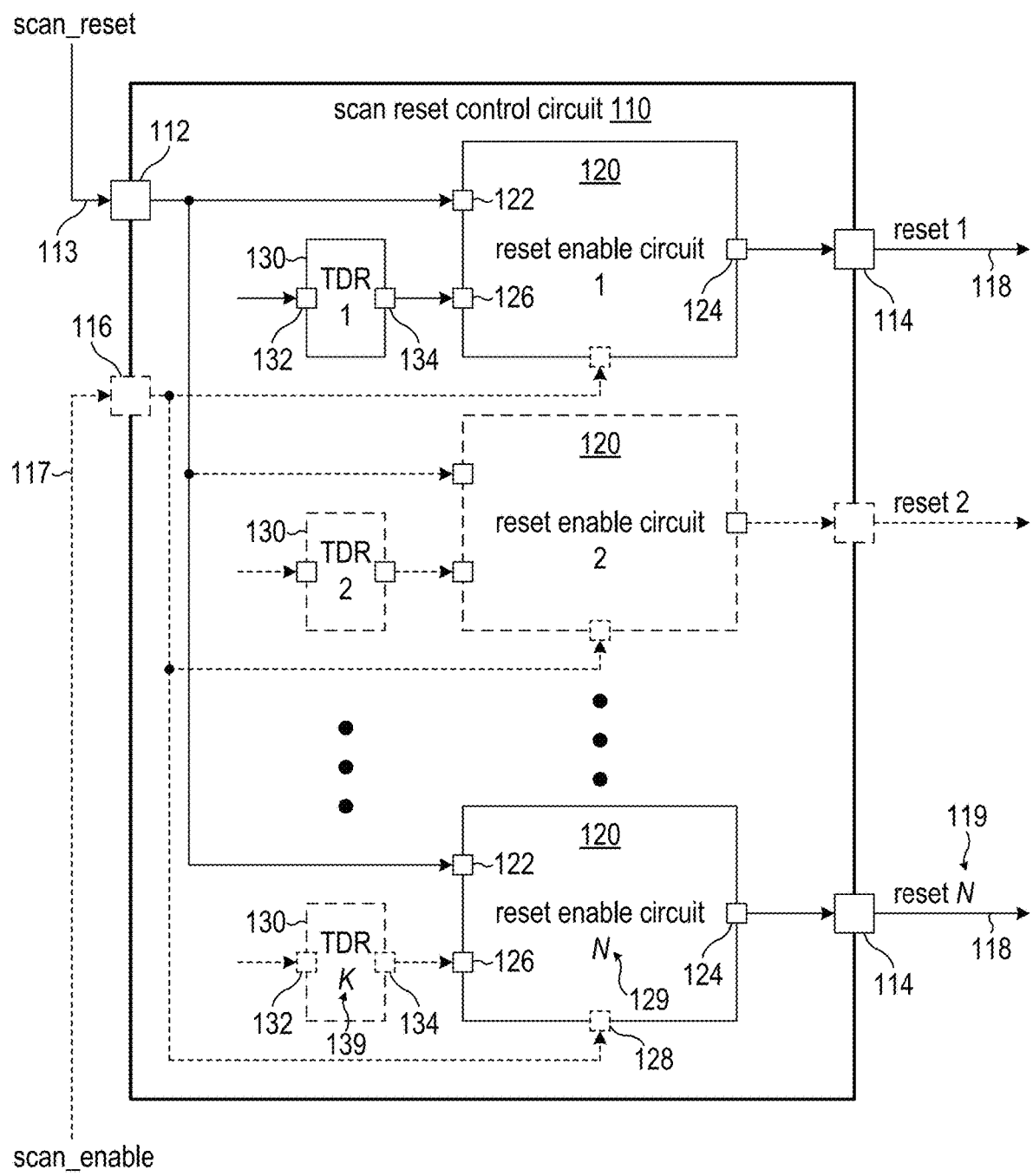
FIG. 1 illustrates an example scan reset control circuit configured to receive a scan reset signal and generate circuit block-specific reset signals using multiple writable non-scan test data registers and reset enable circuits in accordance with embodiments of the invention.

Corresponding numerals and symbols in the different figures generally refer to corresponding parts unless otherwise indicated. The figures are drawn to clearly illustrate the relevant aspects of the embodiments and are not necessarily drawn to scale. The edges of features drawn in the figures do not necessarily indicate the termination of the extent of the feature.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope. Unless specified otherwise, the expressions "around", "approximately", and "substantially" signify within 10%, and preferably within 5% of the given value or, such as in the case of substantially zero, less than 10% and preferably less than 5% of a comparable quantity.

ATPG patterns may be generated to cover as many types of faults as possible in a given integrated circuit. For example, it can be important to cover faults on the reset network of the integrated circuit with ATPG patterns. Conventional approaches pulse a reset signal to all the flip-flops in a design at the same time. However, as design sizes increase, the number of flip-flops that are being toggled simultaneously increases drastically. For example, it is not unheard of for modern design to include millions or even tens of millions of flip-flops that are simultaneously toggled.

Each flip-flop that is toggled causes current to flow in the design which results in a small drop in voltage (often referred to as IR drop in integrated circuit design from the ubiquitous equation V=IR). When large numbers of flip-flops are toggled simultaneously, a large amount of current flows and the corresponding IR drop is also large. This can cause the voltage inside the device to go below the working voltage of circuits included in the design, such as phase-locked loop (PLL) circuits, for example. In the specific example of PLL circuits, an IR drop below the working voltage can unlock the PLL circuit resulting in an unknown clock during the ATPG pattern. This may in turn lead to pattern failure or instabilities on silicon. Of course, undesirably low voltages due to IR drop can adversely affect any circuit or component causing instability and unpredictability. Therefore, excessive IR drop during testing of the integrated circuit is undesirable.

In accordance with embodiment herein described, the invention proposes to add a scan reset control circuit between a scan reset pad and the multiple circuit blocks of an integrated circuit. The scan reset control circuit allows the reset signal to desired circuit blocks to be switched off when pulsing the reset signal to avoid undesirable IR drop during testing. In various embodiments, the scan rest control circuit is configured to receive a reset signal at a single scan reset input and assert of deassert the reset signal at a plurality of scan reset outputs coupled to the circuit blocks in a one-to-one ratio. That is, a circuit block-specific reset signal configured to simultaneously reset a set of scan flip-flops of the corresponding circuit block is generated at each of the scan reset outputs.

The scan reset control circuit includes a plurality of writable non-scan test data registers, each comprising an output configured to assert of deassert the reset signal. The register outputs are coupled to a selector input of a plurality of reset enable circuits. Outputs of the reset enable circuits are coupled to the scan reset outputs in a one-to-one ratio. Specifically, the data stored in the test data registers may be considered a reset pattern that is used (either directly or indirectly, such as using an intervening decoder) to determine which circuit blocks receive the reset signal and which do not. The reset pattern may be updated after capturing test results to test circuit blocks that were not reset during a previous test.

Embodiments of the invention may have various advantages over conventional techniques. For example, the scan reset control circuits may allow desired circuit blocks to be switched off according to the specific needs of a given design to optimize mitigation of undesirable IR drop during patterns covering the reset network of an integrated circuit. The scan reset control circuit may be designed to have maximum flexibility by allowing the rest signal to any circuit block to be individually deasserted or a predetermined arrangement and number of circuit block combinations may be included which may advantageously require fewer circuit components, reduced complexity, and/or reduce the space required by the scan reset control circuit.

Figure 3:
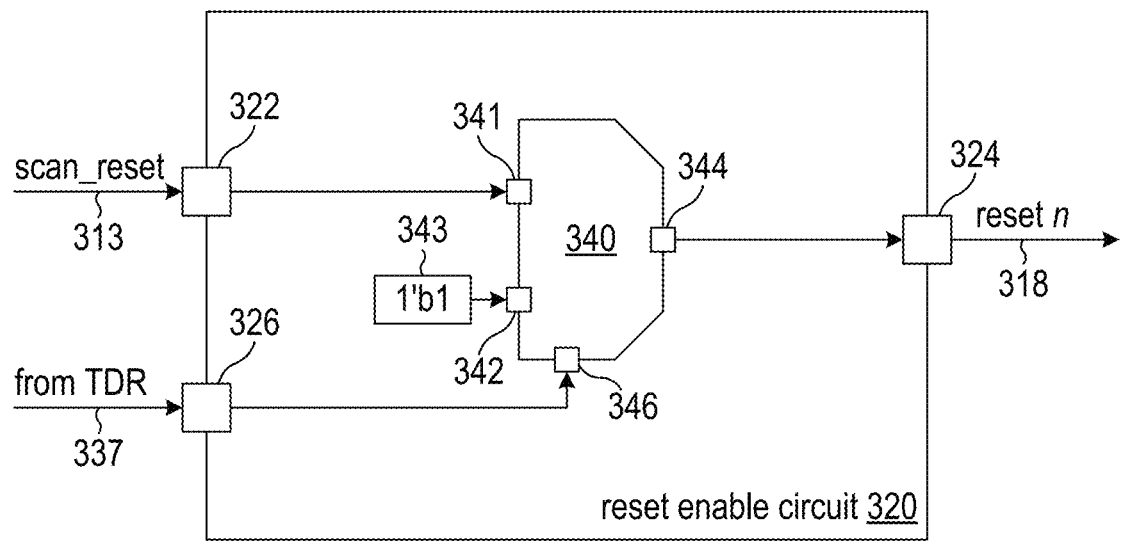
FIG. 3 illustrates an example reset enable circuit that is usable in a scan reset control circuit and includes a scan reset multiplexer in accordance with embodiments of the invention.
Figure 4:
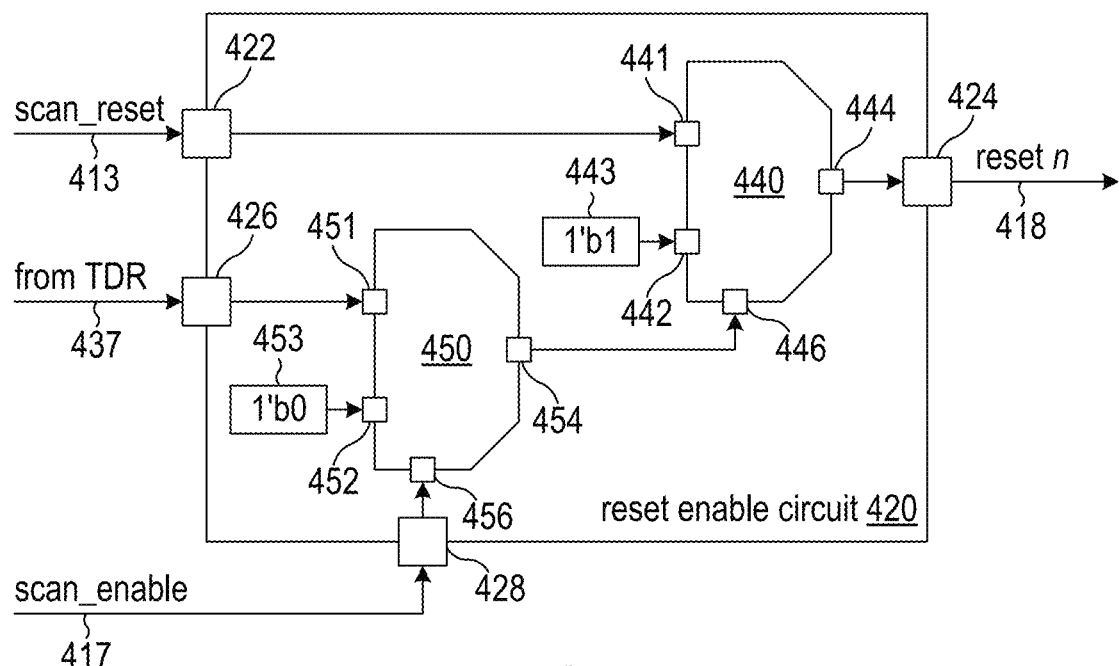
FIG. 4 illustrates another example reset enable circuit that is usable in a scan reset control circuit and includes a scan enable multiplexer in addition to a scan reset multiplexer in accordance with embodiments of the invention.

Embodiments provided below describe various circuits and structures for covering faults on the reset network of an integrated circuit that includes multiple circuit blocks, and, in particular embodiments, to scan reset control circuits that are configured to receive a scan reset signal and generate circuit block-specific reset signals using multiple writable non-scan test data registers and reset enable circuits. The following description describes the embodiments. FIG. 1 is used to describe an example scan reset control circuit. An example integrated circuit including a scan reset control circuit coupled to multiple circuit blocks is described using FIG. 2. FIGS. 3 and 4 are used to describe two example reset enable circuits. Three more example scan reset control circuits are described using FIGS. 5-7. Another example integrated circuit is described using FIG. 8 while FIG. 9 is used to describe an example method of testing an integrated circuit.

FIG. 1 illustrates an example scan reset control circuit configured to receive a scan reset signal and generate circuit block-specific reset signals using multiple writable non-scan test data registers and reset enable circuits in accordance with embodiments of the invention.

Referring to FIG. 1, a scan reset control circuit 110 includes a single scan reset input 112 and a plurality of reset enable circuits 120, each coupled to a respective scan reset output 114. The single scan reset input 112 is configured to receive a reset signal 113 that is provided to a reset enable circuit input 122 of each of the reset enable circuits 120. At least one test data register 130 is configured to control the assertion or deassertion of the reset signal 113 at each scan reset output 114 using a reset pattern that is stored using a corresponding register input 132 of each test data register 130. The respective bits of the reset pattern are then provided at register outputs 134 of the at least one test data register 130 coupled to reset enable circuit selector inputs 126 of the reset enable circuits 120.

The scan reset control circuit 110 includes at least two reset enable circuits 120 (each coupled to a corresponding scan reset output 114). However, any desired total number of reset enable circuits 129 (N) and corresponding total number of scan reset outputs 119 may be included to match the number of circuit blocks of an integrated circuit that includes the scan reset control circuit 110, for example. Each of the reset enable circuits 120 generates a circuit block-specific reset signal 118 at a reset enable circuit output 124. Each of the reset enable circuits 120 may include various circuit components (i.e., hardware logic components), such as inverters and logic gates, which may be together configured as various logic circuits, such as multiplexers, demultiplexers, etc. Of course, the specific implementation of the at least two reset enable circuits 120 may depend on the specific details of a given application.

While more than one test data register 130 is included in various embodiments, only one test data register 130 could be included, such as to toggle between two circuit blocks or two different sets of circuit blocks. That is, the total number of register outputs 139 (K) may be greater than or equal to one. In one embodiment, the total number of register outputs 139 is equal to the total number of scan reset outputs 119 (K=N). In other embodiments, the total number of register outputs 139 is less than the total number of scan reset outputs 119 (K<N), such as if a decoder is included between the at least one test data register 130 and the reset enable circuit selector inputs 126.

The at least one test data register 130 is a non-scan test data register (e.g., a user data register). For example, each included test data register 130 may be a JTAG writable register and may be accessed during a test process. Multiple reset patterns may be loaded into (i.e., stored in) the at least one test data register 130 in order to achieve full test coverage since one or more circuit blocks may be disabled for each test. The exact method by which the reset patterns are stored in the at least one test data register 130 may vary (e.g., from shifting the reset pattern into a chain of registers using a single register input into the scan reset control circuit 110 to storing the reset pattern in parallel through a plurality of register inputs coupled to the at least one test data register 130 in a one-to-one ratio and everything in between).

In some embodiments, the scan reset control circuit 110 also includes an optional scan enable input 516 configured to receive a scan enable signal 517 that is provided to a respective optional circuit enable input 128 of the reset enable circuits 120. For example, this may extend the functionality of the scan reset control circuit 110 to allow the reset signal 113 to be pass through the scan reset control circuit 110 undisturbed when the optional scan enable signal 517 is deasserted.

Figure 2:
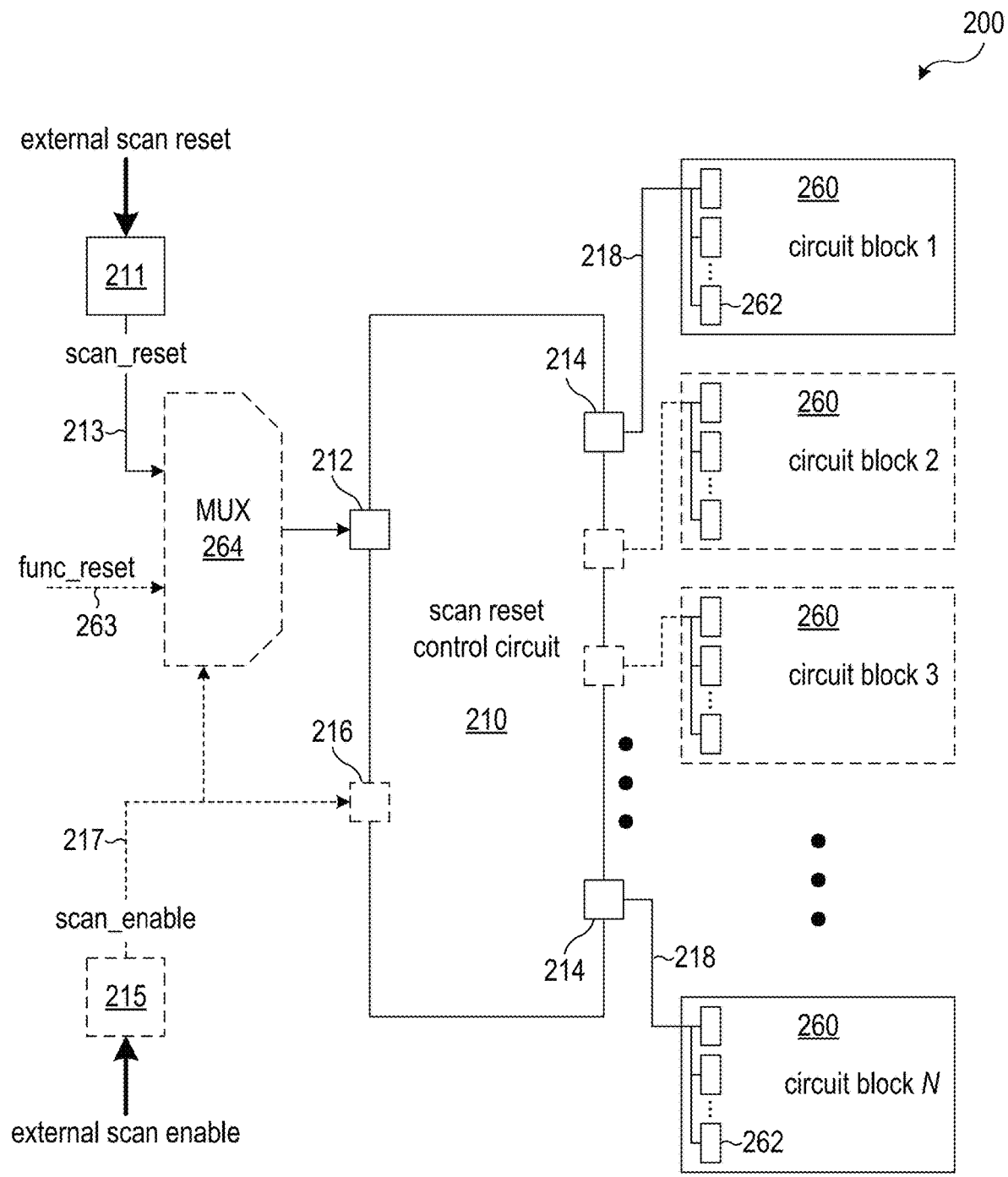
FIG. 2 illustrates an example integrated circuit that includes a scan reset control circuit configured to receive an external scan reset signal from a scan reset pad and generate circuit block-specific reset signals to a plurality of corresponding circuit blocks of the integrated circuit in accordance with embodiments of the invention.

FIG. 2 illustrates an example integrated circuit that includes a scan reset control circuit configured to receive an external scan reset signal from a scan reset pad and generate circuit block-specific reset signals to a plurality of corresponding circuit blocks of the integrated circuit in accordance with embodiments of the invention. The integrated circuit of FIG. 2 may include any of the scan reset control circuits described herein such as the scan reset control circuit of FIG. 1, for example. Similarly labeled elements may be as previously described.

Referring to FIG. 2, an integrated circuit 200 includes a scan reset control circuit 210 and at least two circuit blocks 260, each coupled to a respective scan reset output 214 of the scan reset control circuit 210. It should be noted that here and in the following a convention has been adopted for brevity and clarity wherein elements adhering to the pattern [x10] where 'x' is the figure number may be related implementations of a scan reset control circuit in various embodiments. For example, the scan reset control circuit 210 may be similar to the scan reset control circuit 110 except as otherwise stated. An analogous convention has also been adopted for other elements as made clear by the use of similar terms in conjunction with the aforementioned numbering system.

Each of the at least two circuit blocks 260 is configured to receive a circuit block-specific reset signal 218 that is generated by the scan reset control circuit 210. Each circuit block-specific reset signal 218 is configured to simultaneously reset a set of scan flip flops 262 included in corresponding circuit block. It should be noted that the circuit blocks 260 may be physical or logical. That is, while in many cases each of the circuit blocks 260 include a set of scan flip-flops located within a physically contiguous (often rectangular) area of the integrated circuit 200, this is not a requirement. In some cases one or more of the circuit block 260 may be defined as such merely by the fact that a respective circuit block-specific reset signal 218 is coupled to all of a particular set of scan flip-flops.

The integrated circuit 200 includes a scan reset pad 211 configured to be coupled to an external scan reset signal 213. The reset signal 213 is received by the scan reset control circuit 210 at a single scan reset input 212 and used in combination with a reset pattern to output a circuit block-specific reset signal 218 at each scan reset output 214.

Optionally, an optional scan enable pad 215 may be included that is configured to be coupled to an external scan enable signal 217 (i.e., a signal dictating whether scan mode is enabled or disabled for the integrated circuit 200). When the optional scan enable pad 215 is included, the scan reset control circuit 210 may receive the scan enable signal 217 at an optional scan enable input 216.

An optional functional reset multiplexer 264 may also be included in the integrated circuit 200. The optional functional reset multiplexer 264 may be configured to allow a functional reset signal 263 to be passed to the at least two circuit blocks 260 (i.e., a reset signal that is propagated during functional operation of the integrated circuit 200). For example, the optional functional reset multiplexer 264 may receive the scan enable signal 217 at a selector input to determine whether the scan reset control circuit 210 receives the reset signal 213 or the scan enable signal 217 at the single scan reset input 212. Of course, internal circuitry of the scan reset control circuit 210 may be adjusted when the optional functional reset multiplexer 264 is included to allow the functional reset signal 263 (whether asserted or deasserted) to pass through the scan reset control circuit 210 when the scan enable signal 217 is deasserted.

FIG. 3 illustrates an example reset enable circuit that is usable in a scan reset control circuit and includes a scan reset multiplexer in accordance with embodiments of the invention. The reset enable circuit of FIG. 3 may be a specific implementation of other reset enable circuits described herein such as the reset enable circuits of FIG. 1, for example. Similarly labeled elements may be as previously described.

Referring to FIG. 3, a reset enable circuit 320 includes a reset enable circuit input 322 configured to receive a reset signal 313, a reset enable circuit selector input 326 configured to receive a register output signal 337, and a reset enable circuit output 324 configured to output a circuit block-specific reset signal 318. In this specific example, the reset enable circuit 320 also includes a scan reset multiplexer 340 that receives the reset signal 313 at a first reset multiplexer input 341. A logical "1" signal 343 is coupled to a second reset multiplexer input 342. The register output signal 337 is received by the scan reset multiplexer 340 at a reset multiplexer selector input 346 and determines whether the reset signal 313 is output at a reset multiplexer output 344 of the scan reset multiplexer 340 (and ultimately at the reset enable circuit output 324).

FIG. 4 illustrates another example reset enable circuit that is usable in a scan reset control circuit and includes a scan enable multiplexer in addition to a scan reset multiplexer in accordance with embodiments of the invention. The reset enable circuit of FIG. 4 may be a specific implementation of other reset enable circuits described herein such as the reset enable circuits of FIG. 1, for example. Similarly labeled elements may be as previously described.

Referring to FIG. 4, a reset enable circuit 420 includes a reset enable circuit input 422 configured to receive a reset enable signal 413, a reset enable circuit selector input 426 configured to receive a register output signal 437, and a reset enable circuit output 424 configured to output a circuit block-specific reset signal 418. The reset enable circuit 420 also includes a circuit enable input 428 configured to receive a scan enable signal 417 (in contrast to the reset enable circuit 320 of FIG. 3, for example).

A scan reset multiplexer 440 receives the reset signal 413 at a first reset multiplexer input 441 and a logical "1" signal 443 at a second reset multiplexer input 442. The register output signal 437 is received by a scan enable multiplexer 450 at a first enable multiplexer input 451. A logical "0" signal 453 is coupled to a second enable multiplexer input 452. The scan enable signal 417 is received at a enable multiplexer selector input 456 and determines whether the register output signal 437 is output at an enable multiplexer output 454, which is coupled to a reset multiplexer selector input 446. This additional multiplexer factors the scan enable signal 417 into whether the reset signal 413 is output at a reset multiplexer output 444 of the scan reset multiplexer 440 (and then at the reset enable circuit output 424, as before).

Figure 5:
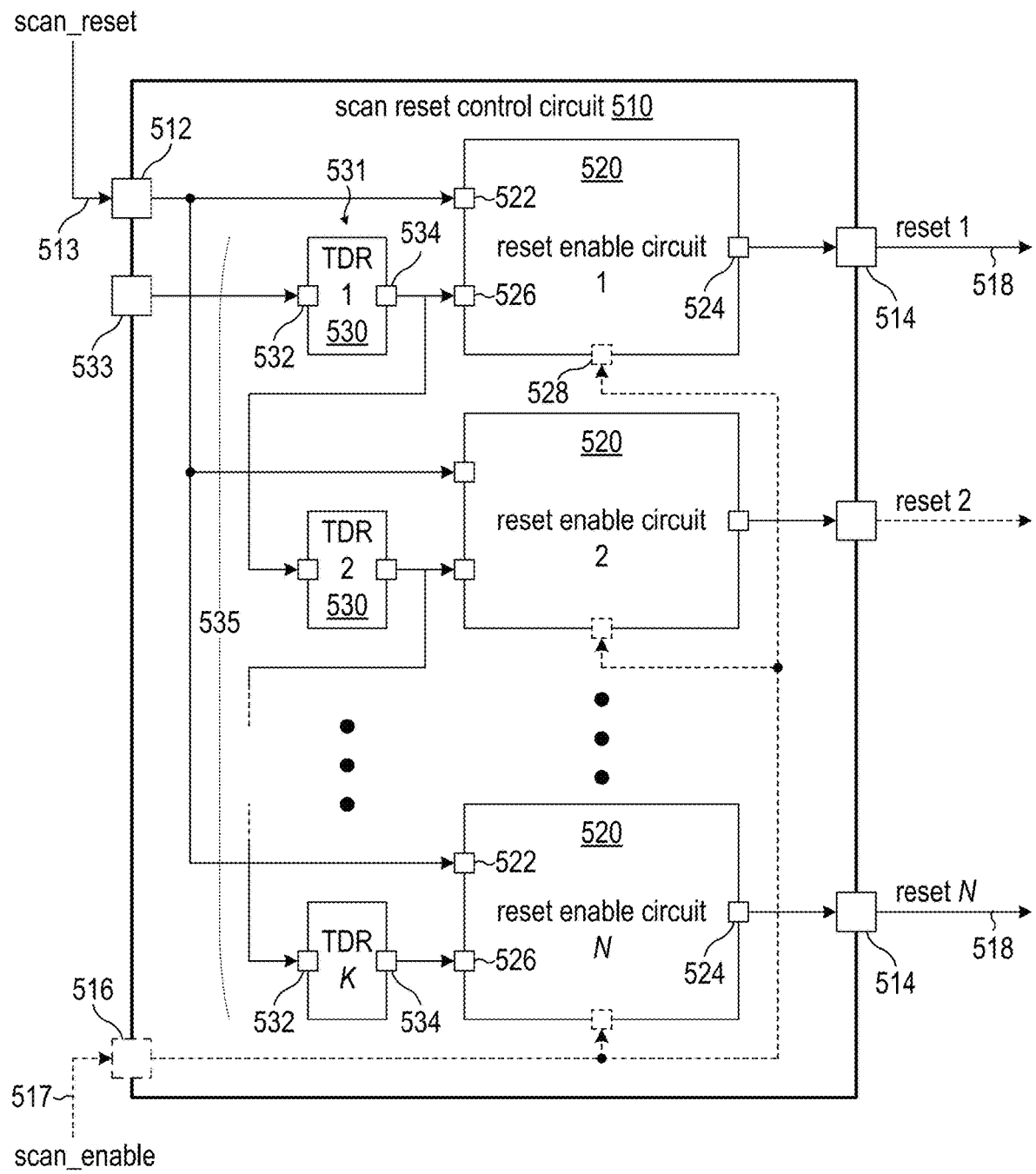
FIG. 5 illustrates another example scan reset control circuit that includes a single register input coupled to a first register of a chain of writable non-scan test data registers configured in accordance with embodiments of the invention.

FIG. 5 illustrates another example scan reset control circuit that includes a single register input coupled to a first register of a chain of writable non-scan test data registers configured in accordance with embodiments of the invention. The scan reset control circuit of FIG. 5 may be a specific implementation of other scan reset control circuits described herein such as the scan reset control circuit of FIG. 1, for example. Similarly labeled elements may be as previously described.

Referring to FIG. 5, a scan reset control circuit 510 includes a single scan reset input 512 and a plurality of reset enable circuits 520, each coupled to a respective scan reset output 514. The single scan reset input 512 is configured to receive a reset signal 513 that is provided to a reset enable circuit input 522 of each of the reset enable circuits 520. A plurality of test data registers 530 is included in this specific example and is configured to control the assertion or deassertion of the reset signal 513 at each scan reset output 514 using a reset pattern that is stored using a corresponding register input 532 of each test data register 530. The respective bits of the reset pattern are then provided at register outputs 534 of the plurality of test data registers 530 coupled to reset enable circuit selector inputs 526 of the reset enable circuits 520.

The scan reset control circuit 510 includes a plurality of reset enable circuits 520 that are each coupled to a corresponding scan reset output 514. Each of the reset enable circuits 520 generates a circuit block-specific reset signal 518 at a reset enable circuit output 524. As before, the scan reset control circuit 510 may also include an optional scan enable input 516 configured to receive a scan enable signal 517 that is provided to a respective optional circuit enable input 528 of the reset enable circuits 520. For example, this may extend the functionality of the scan reset control circuit 510 to allow the reset signal 513 to be pass through the scan reset control circuit 510 undisturbed when the optional scan enable signal 517 is deasserted.

In this specific example, the plurality of test data registers 530 is implemented as a chain of test data registers 535. In particular, a first register 531 of the chain is coupled to a single register input 533 and the remaining registers are coupled to outputs of the previous register (i.e., configured to allow a reset pattern to be shifted into the chain of test data registers 535 using the single register input 533).

Figure 6:
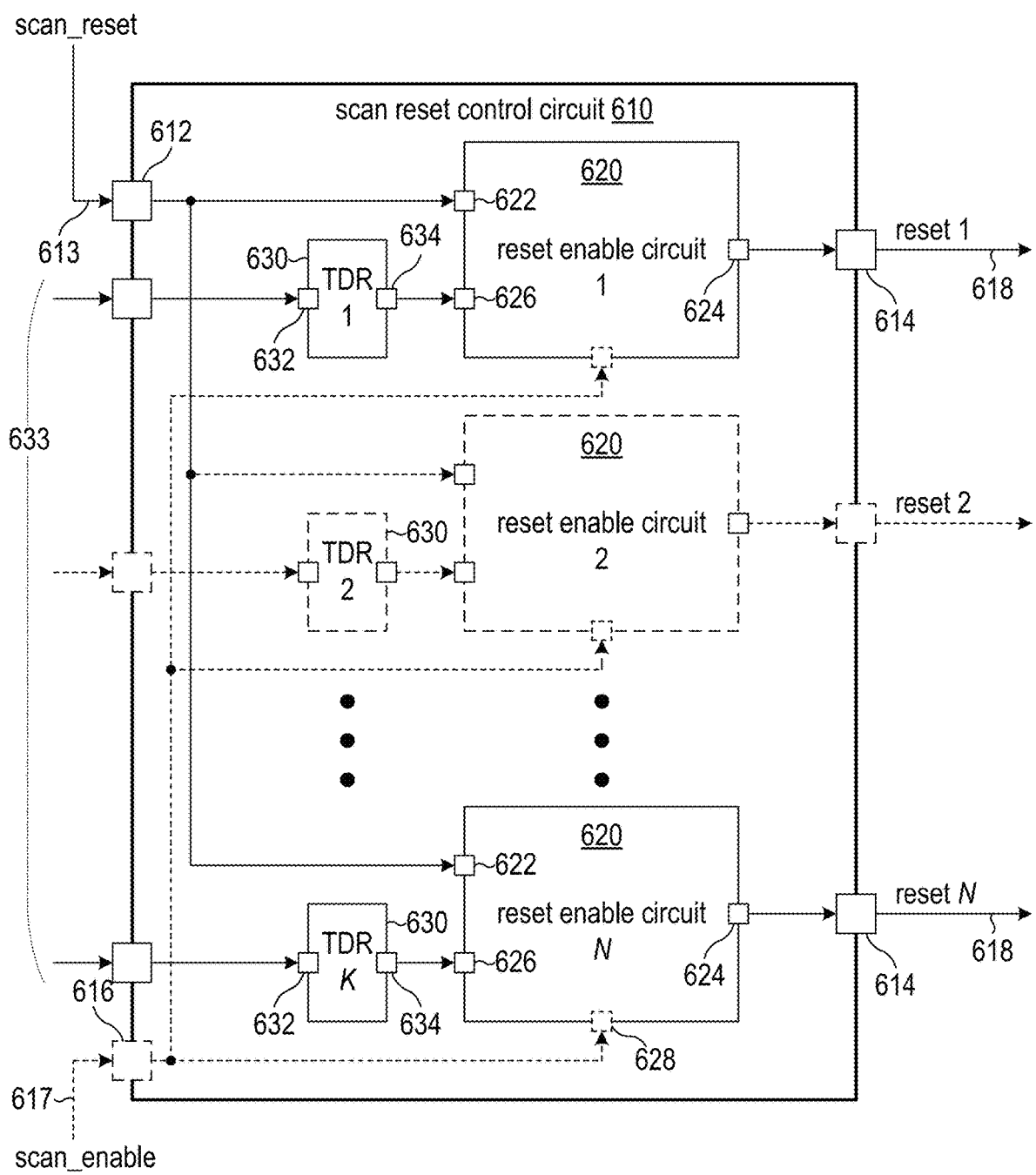
FIG. 6 illustrates still another example scan reset control circuit that includes multiple register inputs coupled to writable non-scan test data registers in a one-to-one ratio in accordance with embodiments of the invention.

FIG. 6 illustrates still another example scan reset control circuit that includes multiple register inputs coupled to writable non-scan test data registers in a one-to-one ratio in accordance with embodiments of the invention. The scan reset control circuit of FIG. 5 may be a specific implementation of other scan reset control circuits described herein such as the scan reset control circuit of FIG. 1, for example. Similarly labeled elements may be as previously described.

Referring to FIG. 6, a scan reset control circuit 610 includes a single scan reset input 612 and a plurality of reset enable circuits 620, each coupled to a respective scan reset output 614. The single scan reset input 612 is configured to receive a reset signal 613 that is provided to a reset enable circuit input 622 of each of the reset enable circuits 620. A plurality of test data registers 630 is included in this specific example and is configured to control the assertion or deassertion of the reset signal 613 at each scan reset output 614 using a reset pattern that is stored using a corresponding register input 632 of each test data register 630. The respective bits of the reset pattern are then provided at register outputs 634 of the plurality of test data registers 630 coupled to reset enable circuit selector inputs 626 of the reset enable circuits 620.

The scan reset control circuit 610 includes a plurality of reset enable circuits 620 that are each coupled to a corresponding scan reset output 614. Each of the reset enable circuits 620 generates a circuit block-specific reset signal 618 at a reset enable circuit output 624. As before, the scan reset control circuit 610 may also include an optional scan enable input 616 configured to receive a scan enable signal 617 that is provided to a respective optional circuit enable input 628 of the reset enable circuits 620. For example, this may extend the functionality of the scan reset control circuit 610 to allow the reset signal 613 to be pass through the scan reset control circuit 610 undisturbed when the optional scan enable signal 617 is deasserted.

Different from the scan reset control circuit 510 of FIG. 5, the register input 632 of each of the plurality of test data registers 630 is coupled to a plurality of register inputs 633 in a one-to-one ratio (e.g., to allow parallel loading of a reset pattern into the plurality of test data registers 630). This example and the example of FIG. 5 can be combined to any extent as desired. For example, two chains of test data registers may be included with two inputs to the scan reset control circuit and each chain may be any desired number of registers (whether the same or different). Of course, other combinations are possible as may be apparent to one of skill in the art based on this disclosure.

Figure 7:
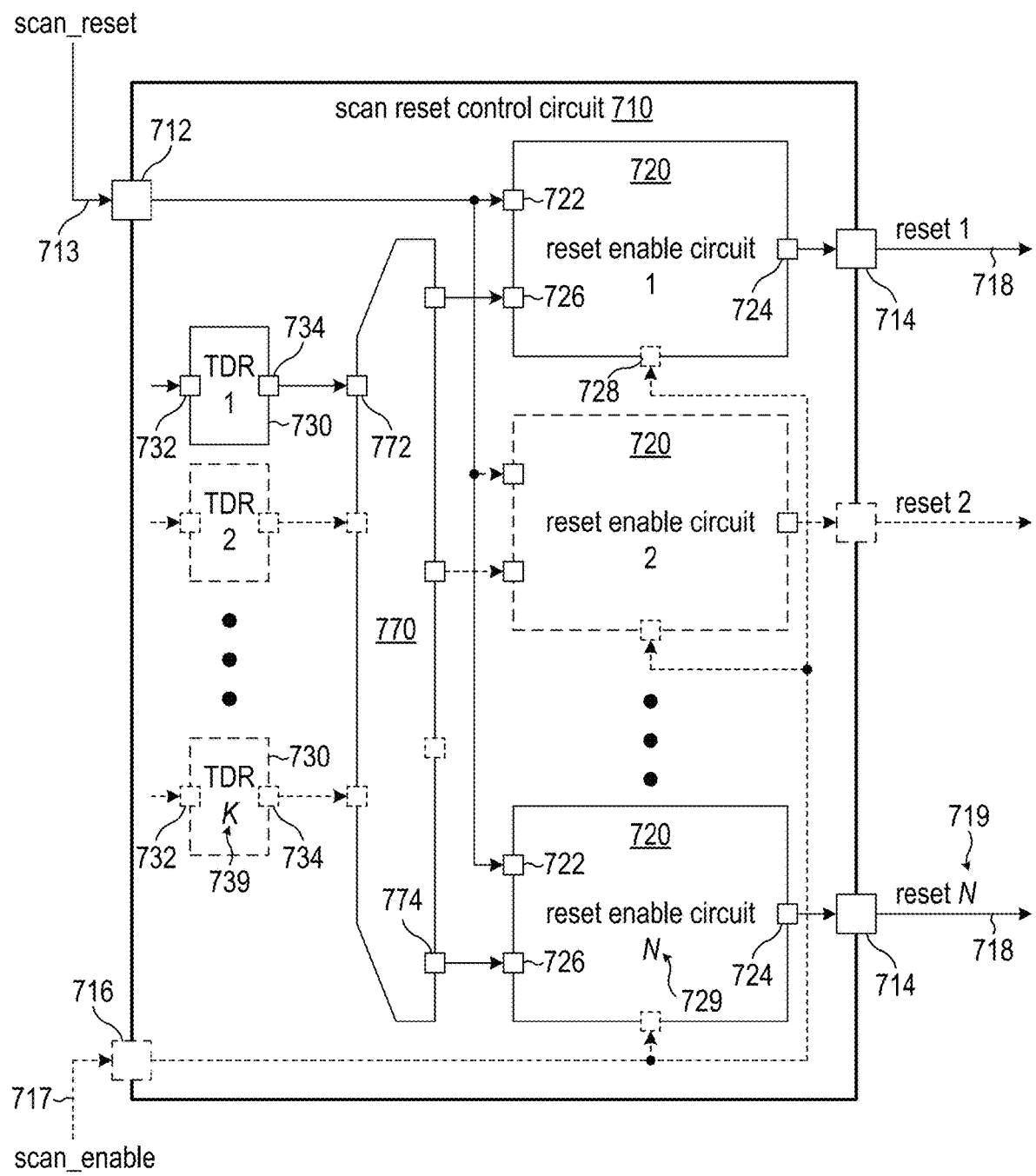
FIG. 7 illustrates yet another example scan reset control circuit that includes a decoder coupled between writable non-scan test data registers and reset enable circuits where the total number of the test data registers is less than the total number of the reset enable circuits in accordance with embodiments of the invention.

FIG. 7 illustrates yet another example scan reset control circuit that includes a decoder coupled between writable non-scan test data registers and reset enable circuits where the total number of the test data registers is less than the total number of the reset enable circuits in accordance with embodiments of the invention. The scan reset control circuit of FIG. 5 may be a specific implementation of other scan reset control circuits described herein such as the scan reset control circuit of FIG. 1, for example. Similarly labeled elements may be as previously described.

Referring to FIG. 7, a scan reset control circuit 710 includes a single scan reset input 712 and a plurality of reset enable circuits 720, each coupled to a respective scan reset output 714. The single scan reset input 712 is configured to receive a reset signal 713 that is provided to a reset enable circuit input 722 of each of the reset enable circuits 720. A plurality of test data registers 730 is included in this specific example and is configured to control the assertion or deassertion of the reset signal 713 at each scan reset output 714 using a reset pattern that is stored using a corresponding register input 732 of each test data register 730. The respective bits of the reset pattern are then provided at register outputs 734 of the plurality of test data registers 730 coupled to reset enable circuit selector inputs 726 of the reset enable circuits 720.

The scan reset control circuit 710 includes a plurality of reset enable circuits 720 that are each coupled to a corresponding scan reset output 714. Each of the reset enable circuits 720 generates a circuit block-specific reset signal 718 at a reset enable circuit output 724. As before, the scan reset control circuit 710 may also include an optional scan enable input 716 configured to receive a scan enable signal 717 that is provided to a respective optional circuit enable input 728 of the reset enable circuits 720. For example, this may extend the functionality of the scan reset control circuit 710 to allow the reset signal 713 to be pass through the scan reset control circuit 710 undisturbed when the optional scan enable signal 717 is deasserted.

In this specific example, a total number of register outputs 739 is less than a total number of reset enable circuits 729 (and consequently also less than a total number of scan reset outputs 719, which is equal to total number of reset enable circuits 729). A decoder 770 is included to decode the reset pattern in the plurality of test data registers 730 into the bit map identifying whether each circuit block-specific reset signal 718 is asserted. The decoder 770 includes a decoder input 772 coupled to each of the register outputs 734. Similarly, the decoder 770 also includes a decoder output 774 coupled to each reset enable circuit selector inputs 726 of the plurality of reset enable circuits 720. To match the respective numbers of reset enable circuits 720 (N) and test data registers 730 (K), the number of inputs of the decoder 770 is less than the number of outputs.

Some amount of space may be saved by including the decoder 770. For example, when a predefined number of possible reset patterns is already known for a design (e.g., P), the number of test data registers 730 K may be decreased to the minimum value of K for which $P \leq 2^K$. On the other hand, the degree to which K is less than N may also reflect a reduction in the configuration flexibility for the scan reset control circuit 710. That is, fewer test data registers 730 than reset enable circuits 720 eliminates possible reset patterns which may or may not be desirable in some circumstances and may depend on how much is known about the IR drop and circuit blocks of a given design before the scan reset control circuit 710 is fabricated.

Figure 8:
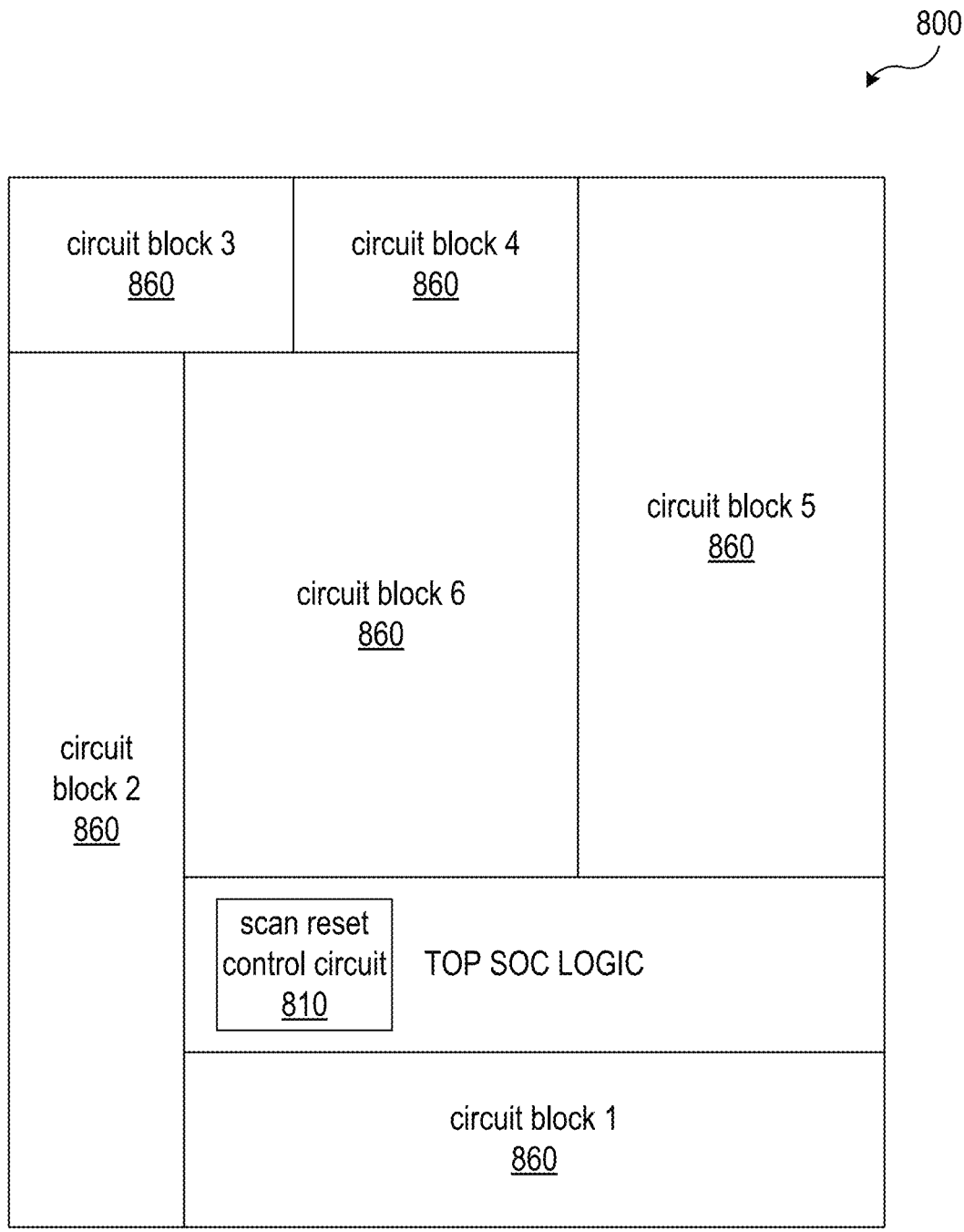
FIG. 8 illustrates an example integrated circuit that includes a scan reset control circuit in top system-on-chip logic of the integrated circuit as well as six circuit blocks of different relative size and location in accordance with embodiments of the invention.
Figure 9:
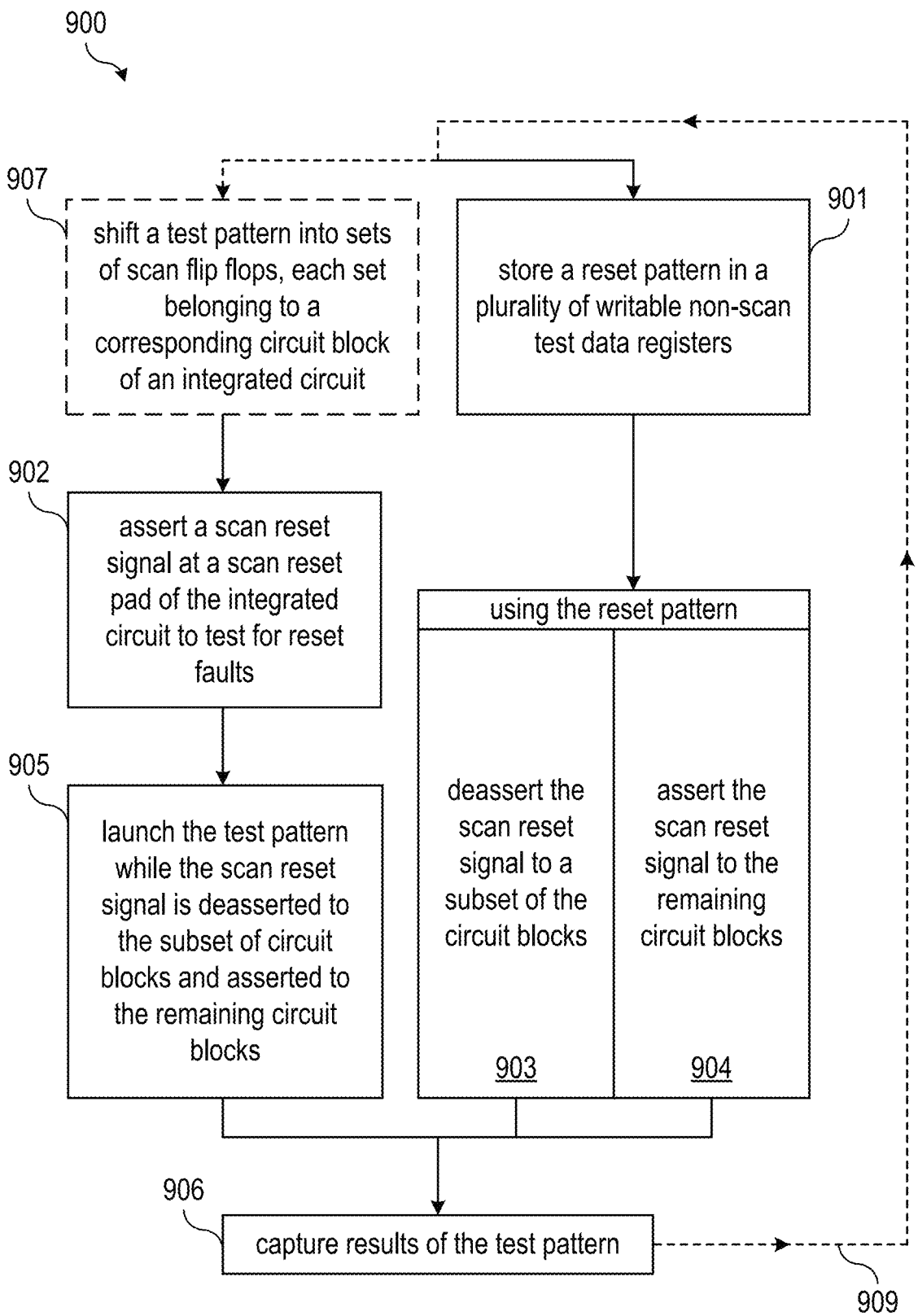
FIG. 9 illustrates an example method of testing an integrated circuit in accordance with embodiments of the invention.

FIG. 8 illustrates an example integrated circuit that includes a scan reset control circuit in top system-on-chip logic of the integrated circuit as well as six circuit blocks of different relative size and location in accordance with embodiments of the invention.

Referring to FIG. 8, an integrated circuit 800 includes a plurality of circuit blocks 860 (here six, but of course any number greater than one is possible). A scan reset control circuit 810 is included in top logic of the integrated circuit 800 (in this case the integrated circuit 800 is a system-on-chip (SoC) and the scan reset control circuit 810 is included in top SoC logic of the integrated circuit 800). This schematic layout of the circuit blocks 860 of the integrated circuit 800 is provided merely by way of example to aid in the discussion of several possible reset pattern paradigms.

The specific circuit blocks 860 that are reset simultaneously may be determined based on the details of a given design. For example, IR drop analysis may be performed to assess the impact of resetting certain circuit blocks together or separately. In some cases, each circuit block may be reset separately while in other cases only two groups of circuit blocks need be identified to prevent the IR drop from exceeding a safe threshold (e.g., a predetermined threshold determined to be safe for a given design).

Certain parameters may be considered instead of or in addition to IR drop analysis. For example, the physical locations of the circuit blocks 860 may be considered when determining which circuit blocks 860 to reset simultaneously. In various embodiments, reset patterns may avoid resetting adjacent circuit blocks at the same time (e.g., circuit block 3 and circuit block 4 are not switched together while circuit block 3 and circuit clock 1 can be switched together).

Another parameter that may be used is the number of flip-flops that are being switched in each circuit block. The number of flip-flops can be different between circuit blocks. One methodology of determining appropriate reset patterns may be to balance the number of flip-flops that are switched at the same time between reset patterns (to the extent possible) with all reset patterns simultaneously switching a number of flip-flops below a predetermined threshold (e.g., that has been determined based on estimated, calculated, or measure IR drop per flip-flop and an IR drop threshold that is determined to be safe for the design).

FIG. 9 illustrates an example method of testing an integrated circuit in accordance with embodiments of the invention. The method of FIG. 9 may be combined with other methods and performed using the systems and apparatuses as described herein. For example, the method of FIG. 9 may be combined with any of the embodiments of FIGS. 1-8. Although shown in a logical order, the arrangement and numbering of the steps of FIG. 9 are not intended to be limited. The method steps of FIG. 9 may be performed in any suitable order or concurrently with one another as may be apparent to a person of skill in the art.

Referring to FIG. 9, a method 900 of testing an integrated circuit that includes multiple circuit blocks includes a step 901 of storing a reset pattern in a plurality of writable non-scan test data registers of the integrated circuit. In a step 902, a scan reset signal is asserted at a scan reset pad of the integrated circuit (e.g., to test for reset faults). Then, using the reset pattern, the scan reset signal is deasserted to a subset of circuit blocks of a plurality of circuit blocks of the integrated circuit and asserted to the remaining circuit blocks (all those not in the subset of circuit blocks) in step 903 and step 904, respectively. The scan reset signal is either asserted or deasserted at outputs of the writable non-scan test data registers using the reset pattern.

A test pattern is then launched in a step 905 while the scan reset signal is deasserted to the subset of circuit blocks and asserted to the remaining circuit blocks. In a step 906, the results of the test pattern are captured. At step 905, the test pattern may already be in sets of scan flip-flops (each set belonging to a corresponding circuit block of the integrated circuit). For example, the test pattern may be shifted into the sets of scan flip-flops in an optional step 907.

The method 900 may optionally be repeated as part of a cycle, as shown by the arrow 909. For example, the method 900 may be repeated with different rest patterns in order to pulse the reset signals to circuit blocks that were previously disabled while other circuit blocks were tested. Specifically, a second reset pattern may be stored in the plurality of writable non-scan test data registers (step 901) and the scan reset signal may be deasserted to a second subset of circuit blocks and asserted to the remaining circuit blocks (step 903 and step 904). A second test pattern may then be launched and captured in step 905 and step 906, respectively. Notably, the second test pattern may be the same as the first test pattern (i.e., optional step 907 would be omitted during the second cycle of the method 900) or may be a different test pattern (e.g., that is shifted in during the optional step 907).

At times, the same circuit block may be deasserted multiple times (i.e., when more than two cycles are desired to test all of the circuit blocks). For example, a third reset pattern may be stored in the plurality of writable non-scan test data registers (step 901) and the scan reset signal may be deasserted to a third subset of circuit blocks and asserted to the remaining circuit blocks (step 903 and step 904). A third test pattern (similar or different than the first and second test patterns) may then be launched and captured in step 905 and step 906, respectively. The first and second subset may include at least one common circuit block that is then tested (whether excluded from the third subset and tested with the third test pattern or excluded from a future subset of circuit blocks).

Various methodologies may be utilized to determine which circuit blocks to test simultaneously. As discussed above, the test patterns may be determined based on IR drop analysis. That is, each subset of circuit blocks may be selected to limit IR drop to within a predetermined threshold in the integrated circuit during the launching of a test pattern based on IR drop analysis. In some cases physical proximity may be an important factor in determining which circuit blocks may be simultaneously reset. For example, subsets of circuit blocks may be selected so that the remaining circuit blocks (i.e., those being reset) are physically separated from one another. Another possible factor may be the total number of flip-flops being reset at the same time. For example, subsets of circuit blocks may be selected to limit the number of flip-flops in the remaining circuit blocks to a predetermined value to mitigate IR drop in the integrated circuit during the launching of test patterns. Of course, any of these (and other) methodologies may be combined as desired based on the specific details of a given application.

Example embodiments of the invention are summarized here. Other embodiments can also be understood from the entirety of the specification as well as the claims filed herein.

Example 1. A scan reset control circuit including: a single scan reset input configured to receive a reset signal; a plurality of scan reset outputs configured to be coupled to a plurality of circuit blocks in a one-to-one ratio, each scan reset output being configured to simultaneously reset a set of scan flip-flops of the corresponding circuit block; a plurality of writable non-scan test data registers including register outputs configured to assert or deassert the reset signal; and a plurality of reset enable circuits coupled to the plurality of scan reset outputs in a one-to-one ratio, each of the plurality of reset enable circuits including an input coupled to the single scan reset input, a selector input coupled to the register outputs, and an output coupled to the corresponding scan reset output.

Example 2. The scan reset control circuit of example 1, where each of the plurality of reset enable circuits includes a scan reset multiplexer including first reset multiplexer input coupled to the single scan reset input, a second reset multiplexer input coupled to a logical one signal, a reset multiplexer selector input coupled to the register outputs, and a reset multiplexer output coupled to the corresponding scan reset output.

Example 3. The scan reset control circuit of example 2, where each of the plurality of reset enable circuits further includes a scan enable multiplexer coupled between the register outputs and the selector input of the corresponding scan reset multiplexer, the scan enable multiplexer including first enable multiplexer input coupled to the register outputs, a second enable multiplexer input coupled to a logical zero signal, an enable multiplexer selector input coupled to a scan enable signal, an enable multiplexer output coupled to the reset multiplexer selector input of the corresponding scan reset multiplexer.

Example 4. The scan reset control circuit of one of examples 1 to 3, further including: a single register input coupled to a first register of the plurality of writable non-scan test data registers, the plurality of writable non-scan test data registers being arranged as a chain of test data registers configured to shift data values received at the single register input through the chain.

Example 5. The scan reset control circuit of one of examples 1 to 3, further including: a plurality of register inputs coupled to the plurality of writable non-scan test data registers in a one-to-one ratio.

Example 6. The scan reset control circuit of one of examples 1 to 5, where the total number of scan reset outputs of the scan reset circuit and the total number of register outputs of the plurality of writable non-scan test data registers of the scan reset circuit are equal.

Example 7. The scan reset control circuit of one of examples 1 to 5, further including: a decoder including plurality of decoder inputs each coupled to a corresponding register output of the plurality of writable non-scan test data registers in a one-to-one ratio, and a plurality of decoder outputs each coupled to a corresponding input of the plurality of reset enable circuits in a one-to-one ratio, where the total number of scan reset outputs of the scan reset circuit is greater than the total number of register outputs of the plurality of writable non-scan test data registers of the scan reset circuit.

Example 8. An integrated circuit including: scan reset pad configured to receive a reset signal external to the integrated circuit; a plurality of circuit blocks including a set of scan flip-flops configured to be simultaneously reset by the reset signal; a plurality of writable non-scan test data registers including register outputs configured to assert or de-assert the reset signal; and a plurality of reset enable circuits coupled to the plurality of circuit blocks in a one-to-one ratio, each of the plurality of reset enable circuits including an input coupled to the scan reset pad, a selector input coupled to the register outputs, and an output coupled to the corresponding circuit block.

Example 9. The integrated circuit of example 8, where each of the plurality of reset enable circuits includes a plurality of scan reset multiplexers each including a first reset multiplexer input coupled to the scan reset pad, a second reset multiplexer input coupled to a logical one signal, a reset multiplexer selector input coupled to the register outputs, and a reset multiplexer output coupled to the corresponding scan reset output.

Example 10. The integrated circuit of example 9, further including: a scan enable pad configured to receive a scan enable signal external to the integrated circuit, the scan enable signal being configured to simultaneously assert the register outputs or deassert the reset signal, where each of the plurality of reset enable circuits further includes a plurality of scan enable multiplexers coupled between the register outputs and the selector input of the corresponding scan reset multiplexer, each of the plurality of scan enable multiplexers including a first enable multiplexer input coupled to the register outputs, a second enable multiplexer input coupled to a logical zero signal, an enable multiplexer selector input coupled to the scan enable pad, and an enable multiplexer output coupled to the reset multiplexer selector input of the corresponding scan reset multiplexer.

Example 11. The integrated circuit of one of examples 8 to 10, where the total number of scan reset outputs of the scan reset circuit and the total number of register outputs of the plurality of writable non-scan test data registers of the scan reset circuit are equal.

Example 12. The integrated circuit of one of examples 8 to 10, further including: a decoder including a plurality of decoder inputs each coupled to a corresponding register output of the plurality of writable non-scan test data registers in a one-to-one ratio, and a plurality of decoder outputs each coupled to a corresponding input of the plurality of reset enable circuits in a one-to-one ratio, where the total number of scan reset outputs of the scan reset circuit is greater than the total number of register outputs of the plurality of writable non-scan test data registers of the scan reset circuit.

Example 13. A method of testing an integrated circuit including a plurality of circuit blocks, the method including: shifting a first test pattern into a plurality of sets of scan flip-flops of the integrated circuit, each set of scan flip-flops being included within a corresponding circuit block of the plurality of circuit blocks in a one-to-one ratio; storing a first reset pattern in a plurality of writable non-scan test data registers of the integrated circuit; asserting a scan reset signal at a scan reset pad of the integrated circuit to test for reset faults; deasserting the scan reset signal to a first subset of circuit blocks of the plurality of circuit blocks and asserting the scan reset signal to the remaining circuit blocks not in the first subset at outputs of the writable non-scan test data registers using the first reset pattern; launching the first test pattern while the scan reset signal is deasserted to the first subset of circuit blocks and asserted to the remaining circuit blocks not in the first subset; and capturing results of the first test pattern.

Example 14. The method of example 13, further including: storing a second reset pattern in the plurality of writable non-scan test data registers; deasserting the scan reset signal to a second subset of circuit blocks of the plurality of circuit blocks and asserting the scan reset signal to the remaining circuit blocks not in the second subset at outputs of the writable non-scan test data registers using the second reset pattern; launching a second test pattern while the scan reset signal is deasserted to the second subset of circuit blocks and asserted to the remaining circuit blocks not in the second subset; and capturing results of the second test pattern.

Example 15. The method of example 14, where the second test pattern is the same as the first test pattern.

Example 16. The method of example 14, further including: shifting the second test pattern into the plurality of sets of scan flip-flops before launching the second test pattern, the second test pattern being different than the first test pattern.

Example 17. The method of one of examples 13 to 16, further including: storing a third reset pattern in the plurality of writable non-scan test data registers; deasserting the scan reset signal to a third subset of circuit blocks of the plurality of circuit blocks and asserting the scan reset signal to the remaining circuit blocks not in the third subset at outputs of the writable non-scan test data registers using the third reset pattern, the first subset and the second subset having at least one common circuit block; launching a third test pattern while the scan reset signal is deasserted to the third subset of circuit blocks and asserted to the remaining circuit blocks not in the third subset; and capturing results of the third test pattern.

Example 18. The method of one of examples 13 to 17, where the first subset of circuit blocks is selected to limit IR drop to within a predetermined threshold in the integrated circuit during the launching of the first test pattern based on IR drop analysis.

Example 19. The method of one of examples 13 to 18, where the first subset of circuit blocks is selected so that the remaining circuit blocks not in the first subset are physically separated from one another.

Example 20. The method of one of examples 13 to 19, where the first subset of circuit blocks is selected to limit the number of flip-flops in the remaining circuit blocks not in the first subset to a predetermined value to mitigate IR drop in the integrated circuit during the launching of the first test pattern.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A scan reset control circuit comprising:
   a single scan reset input configured to receive a reset signal;
   a plurality of scan reset outputs configured to be coupled to a plurality of circuit blocks in a one-to-one ratio, each scan reset output being configured to simultaneously reset a set of scan flip-flops of the corresponding circuit block;
   a plurality of writable non-scan test data registers comprising register outputs configured to assert or deassert the reset signal; and
   a plurality of reset enable circuits coupled to the plurality of scan reset outputs in a one-to-one ratio, each of the plurality of reset enable circuits comprising
      an input coupled to the single scan reset input,
      a selector input coupled to the register outputs, and
      an output coupled to the corresponding scan reset output.

2. The scan reset control circuit of claim 1, wherein each of the plurality of reset enable circuits comprises a scan reset multiplexer comprising
   a first reset multiplexer input coupled to the single scan reset input,
   a second reset multiplexer input coupled to a logical one signal,
   a reset multiplexer selector input coupled to the register outputs, and
   a reset multiplexer output coupled to the corresponding scan reset output.

3. The scan reset control circuit of claim 2, wherein each of the plurality of reset enable circuits further comprises a scan enable multiplexer coupled between the register outputs and the selector input of the corresponding scan reset multiplexer, the scan enable multiplexer comprising
   a first enable multiplexer input coupled to the register outputs,
   a second enable multiplexer input coupled to a logical zero signal,
   an enable multiplexer selector input coupled to a scan enable signal, an enable multiplexer output coupled to the reset multiplexer selector input of the corresponding scan reset multiplexer.

4. The scan reset control circuit of claim 1, further comprising:
a single register input coupled to a first register of the plurality of writable non-scan test data registers, the plurality of writable non-scan test data registers being arranged as a chain of test data registers configured to shift data values received at the single register input through the chain.

5. The scan reset control circuit of claim 1, further comprising:
a plurality of register inputs coupled to the plurality of writable non-scan test data registers in a one-to-one ratio.

6. The scan reset control circuit of claim 1, wherein the total number of scan reset outputs of the scan reset control circuit and the total number of register outputs of the plurality of writable non-scan test data registers of the scan reset circuit are equal.

7. The scan reset control circuit of claim 1, further comprising:
a decoder comprising
a plurality of decoder inputs each coupled to a corresponding register output of the plurality of writable non-scan test data registers in a one-to-one ratio, and
a plurality of decoder outputs each coupled to a corresponding input of the plurality of reset enable circuits in a one-to-one ratio,
wherein the total number of scan reset outputs of the scan reset control circuit is greater than the total number of register outputs of the plurality of writable non-scan test data registers of the scan reset control circuit.

8. An integrated circuit comprising:
a scan reset pad configured to receive a reset signal external to the integrated circuit;
a plurality of circuit blocks comprising a set of scan flip-flops configured to be simultaneously reset by the reset signal;
a plurality of writable non-scan test data registers comprising register outputs configured to assert or de-assert the reset signal; and
a plurality of reset enable circuits coupled to the plurality of circuit blocks in a one-to-one ratio, each of the plurality of reset enable circuits comprising
an input coupled to the scan reset pad,
a selector input coupled to the register outputs, and
an output coupled to the corresponding circuit block.

9. The integrated circuit of claim 8,
wherein each of the plurality of reset enable circuits comprises a plurality of scan reset multiplexers each comprising
a first reset multiplexer input coupled to the scan reset pad,
a second reset multiplexer input coupled to a logical one signal,
a reset multiplexer selector input coupled to the register outputs, and
a reset multiplexer output coupled to the corresponding scan reset output.

10. The integrated circuit of claim 9, further comprising:
a scan enable pad configured to receive a scan enable signal external to the integrated circuit, the scan enable signal being configured to simultaneously assert the register outputs or deassert the reset signal,
wherein each of the plurality of reset enable circuits further comprises a plurality of scan enable multiplexers coupled between the register outputs and the selector input of the corresponding scan reset multiplexer, each of the plurality of scan enable multiplexers comprising
a first enable multiplexer input coupled to the register outputs,
a second enable multiplexer input coupled to a logical zero signal,
an enable multiplexer selector input coupled to the scan enable pad, and
an enable multiplexer output coupled to the reset multiplexer selector input of the corresponding scan reset multiplexer.

11. The integrated circuit of claim 8, wherein the total number of scan reset outputs of the scan reset control circuit and the total number of register outputs of the plurality of writable non-scan test data registers of the scan reset control circuit are equal.

12. The integrated circuit of claim 8, further comprising:
a decoder comprising
a plurality of decoder inputs each coupled to a corresponding register output of the plurality of writable non-scan test data registers in a one-to-one ratio, and
a plurality of decoder outputs each coupled to a corresponding input of the plurality of reset enable circuits in a one-to-one ratio,
wherein the total number of scan reset outputs of the scan reset control circuit is greater than the total number of register outputs of the plurality of writable non-scan test data registers of the scan reset control circuit.

13. A method of testing an integrated circuit comprising a plurality of circuit blocks, the method comprising:
shifting a first test pattern into a plurality of sets of scan flip-flops of the integrated circuit, each set of scan flip-flops being comprised within a corresponding circuit block of the plurality of circuit blocks in a one-to-one ratio;
storing a first reset pattern in a plurality of writable non-scan test data registers of the integrated circuit;
asserting a scan reset signal at a scan reset pad of the integrated circuit to test for reset faults;
deasserting the scan reset signal to a first subset of circuit blocks of the plurality of circuit blocks and asserting the scan reset signal to the remaining circuit blocks not in the first subset at outputs of the writable non-scan test data registers using the first reset pattern;
launching the first test pattern while the scan reset signal is deasserted to the first subset of circuit blocks and asserted to the remaining circuit blocks not in the first subset; and
capturing results of the first test pattern.

14. The method of claim 13, further comprising:
storing a second reset pattern in the plurality of writable non-scan test data registers;
deasserting the scan reset signal to a second subset of circuit blocks of the plurality of circuit blocks and asserting the scan reset signal to the remaining circuit blocks not in the second subset at outputs of the writable non-scan test data registers using the second reset pattern;
launching a second test pattern while the scan reset signal is deasserted to the second subset of circuit blocks and asserted to the remaining circuit blocks not in the second subset; and
capturing results of the second test pattern.

15. The method of claim 14, wherein the second test pattern is the same as the first test pattern.

16. The method of claim 14, further comprising:

shifting the second test pattern into the plurality of sets of scan flip-flops before launching the second test pattern, the second test pattern being different than the first test pattern.

17. The method of claim 14, further comprising:

storing a third reset pattern in the plurality of writable non-scan test data registers;

deasserting the scan reset signal to a third subset of circuit blocks of the plurality of circuit blocks and asserting the scan reset signal to the remaining circuit blocks not in the third subset at outputs of the writable non-scan test data registers using the third reset pattern, the first subset and the second subset having at least one common circuit block;

launching a third test pattern while the scan reset signal is deasserted to the third subset of circuit blocks and asserted to the remaining circuit blocks not in the third subset; and capturing results of the third test pattern.

18. The method of claim 13, wherein the first subset of circuit blocks is selected to limit IR drop to within a predetermined threshold in the integrated circuit during the launching of the first test pattern based on IR drop analysis.

19. The method of claim 13, wherein the first subset of circuit blocks is selected so that the remaining circuit blocks not in the first subset are physically separated from one another.

20. The method of claim 13, wherein the first subset of circuit blocks is selected to limit the number of flip-flops in the remaining circuit blocks not in the first subset to a predetermined value to mitigate IR drop in the integrated circuit during the launching of the first test pattern.

* * * * *